(12) United States Patent
Bayram et al.

(10) Patent No.: US 8,941,466 B2
(45) Date of Patent: Jan. 27, 2015

(54) USER AUTHENTICATION FOR DEVICES WITH TOUCH SENSITIVE ELEMENTS, SUCH AS TOUCH SENSITIVE DISPLAY SCREENS

(75) Inventors: Sevinc Bayram, Brooklyn, NY (US); Ahmet Emir Dirik, Brooklyn, NY (US); Nasir Memon, Holmdel, NJ (US); Umut Topkara, Thornwood, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 759 days.

(21) Appl. No.: 12/652,654

(22) Filed: Jan. 5, 2010

(65) Prior Publication Data

US 2010/0225443 A1 Sep. 9, 2010

Related U.S. Application Data

(60) Provisional application No. 61/142,486, filed on Jan. 5, 2009, provisional application No. 61/247,212, filed on Sep. 30, 2009.

(51) Int. Cl.
| | |
|---|---|
| G06F 21/32 | (2013.01) |
| G06F 21/31 | (2013.01) |
| G06F 21/83 | (2013.01) |
| H04W 12/06 | (2009.01) |
| H04W 88/02 | (2009.01) |

(52) U.S. Cl.
CPC .............. *G06F 21/316* (2013.01); *G06F 21/32* (2013.01); *G06F 21/83* (2013.01); *H04W 12/06* (2013.01); *G05B 2219/36168* (2013.01); *G06F 2221/2101* (2013.01); *G06F 2221/2111* (2013.01); *H04W 88/02* (2013.01); *H01L 2463/082* (2013.01)
USPC .......................................... 340/5.82; 340/5.52

(58) Field of Classification Search
CPC ............................... G06F 3/0488; G06F 21/31
USPC ................... 340/5.51, 5.52, 5.82; 341/71, 41; 713/186, 182
See application file for complete search history.

(56) References Cited

U.S. PATENT DOCUMENTS

| | | | | |
|---|---|---|---|---|
| 5,987,153 | A  * | 11/1999 | Chan et al. ..................... | 382/115 |
| 6,393,138 | B1 * | 5/2002 | Chai .............................. | 382/119 |
| 6,400,836 | B2 * | 6/2002 | Senior .......................... | 382/124 |
| 6,498,861 | B1 * | 12/2002 | Hamid et al. ................. | 382/124 |
| 6,509,847 | B1 * | 1/2003 | Anderson ....................... | 341/34 |
| 6,587,577 | B1 * | 7/2003 | Finkelstein ................... | 382/123 |
| 7,102,617 | B2 * | 9/2006 | Gust ............................. | 345/158 |
| 7,180,418 | B1 * | 2/2007 | Willms et al. ............... | 340/568.1 |
| 7,188,314 | B2 * | 3/2007 | Mizrah ......................... | 715/741 |
| 7,508,963 | B2 * | 3/2009 | Shimamura et al. .......... | 382/124 |

(Continued)

*Primary Examiner* — Jennifer Mehmood
*Assistant Examiner* — Rufus Point
(74) *Attorney, Agent, or Firm* — John C. Pokotylo; Straub & Pokotylo (57) ABSTRACT

For user authentication, finger touch information from a user is accepted via a touch sensitive element, the finger touch information including at least a time series of finger touch samples that define a trace of the user's signature, and each of the finger touch samples including centroid coordinates and non-centroid information, the non-centroid information including at least one of (A) a shape of the finger touch sample, (B) a size of the finger touch sample, (C) an orientation of the finger touch sample, and (D) characteristics of a multi-touch finger touch sample. A similarity of such finger touch samples with previously entered and stored finger touch samples is determined and compared with a threshold for purposes of user authentication.

20 Claims, 10 Drawing Sheets

(56) References Cited

U.S. PATENT DOCUMENTS

| | | | |
|---|---|---|---|
| 7,577,987 B2* | 8/2009 | Mizrah | 726/5 |
| 7,593,000 B1 | 9/2009 | Chin | |
| 7,730,401 B2* | 6/2010 | Gillespie et al. | 715/702 |
| 7,762,456 B2* | 7/2010 | Register et al. | 235/382 |
| 7,782,297 B2* | 8/2010 | Zalewski et al. | 345/156 |
| 8,009,147 B2* | 8/2011 | Chang et al. | 345/173 |
| 8,049,720 B2* | 11/2011 | Gust | 345/158 |
| 8,145,912 B2* | 3/2012 | McLean | 713/182 |
| 8,539,550 B1* | 9/2013 | Terres et al. | 726/2 |
| 2001/0036299 A1* | 11/2001 | Senior | 382/124 |
| 2002/0158747 A1* | 10/2002 | McGregor et al. | 340/5.26 |
| 2003/0161510 A1* | 8/2003 | Fujii | 382/124 |
| 2005/0040968 A1* | 2/2005 | Damarla et al. | 340/825.49 |
| 2006/0126908 A1* | 6/2006 | Moon et al. | 382/125 |
| 2006/0227030 A1* | 10/2006 | Clifford et al. | 341/176 |
| 2007/0070050 A1* | 3/2007 | Westerman et al. | 345/173 |
| 2008/0072063 A1* | 3/2008 | Takahashi et al. | 713/186 |
| 2008/0252491 A1* | 10/2008 | De Ruyter et al. | 341/20 |
| 2009/0049297 A1* | 2/2009 | Omernick et al. | 713/168 |
| 2009/0083847 A1* | 3/2009 | Fadell et al. | 726/16 |
| 2009/0085877 A1* | 4/2009 | Chang et al. | 345/173 |
| 2009/0153389 A1* | 6/2009 | Kerr et al. | 341/176 |
| 2009/0165121 A1* | 6/2009 | Kumar | 726/19 |
| 2009/0212902 A1* | 8/2009 | Haddock | 340/5.2 |
| 2010/0052851 A1* | 3/2010 | Kaehler | 340/5.81 |
| 2010/0073126 A1* | 3/2010 | Morin et al. | 340/5.2 |
| 2010/0214057 A1* | 8/2010 | Alvord et al. | 340/5.2 |
| 2010/0225441 A1* | 9/2010 | Fisher | 340/5.73 |
| 2011/0050392 A1* | 3/2011 | Kaizu | 340/5.52 |
| 2011/0156867 A1* | 6/2011 | Carrizo et al. | 340/5.85 |
| 2011/0283354 A1* | 11/2011 | Chang et al. | 726/19 |

* cited by examiner

FIGURE 10
two highest DTW values are displayed with dotted lines

Saved signatures in training step     Signature set and decision threshold is updated with new signature entry

FIGURE 11

USER AUTHENTICATION FOR DEVICES WITH TOUCH SENSITIVE ELEMENTS, SUCH AS TOUCH SENSITIVE DISPLAY SCREENS

§0. RELATED APPLICATIONS

Benefit is claimed, under 35 U.S.C. §119(e)(1), to the filing dates of: (1) U.S. provisional patent application Ser. No. 61/142,486 (referred to as "the '486 provisional"), titled "USER AUTHENTICATION BASED ON TRACKING FINGER TOUCH MOVEMENTS AND BIOMETRICS CAPTURED FROM FINGERTIPS THROUGH TOUCH SENSITIVE DEVICE," filed on Jan. 5, 2009, and listing Ahmet Emir DIRIK, Sevinc BAYRAM, Umut TOPKARA and Nasir MEMON as the inventors; and (2) U.S. provisional patent application Ser. No. 61/247,212 (referred to as "the '212 provisional"), titled "A USER AUTHENTICATION SYSTEM AND METHOD FOR PORTABLE DEVICES," filed on Sep. 30, 2009, and listing Ahmet Emir DIRIK, Umut TOPKARA and Nasir MEMON as the inventors, for any inventions disclosed in the manner provided by 35 U.S.C. §112, ¶ 1. The '486 and '212 provisional applications are expressly incorporated herein by reference. The scope of the present invention is not limited to any requirements of the specific embodiments described in the '486 and '212 provisional applications.

§1. BACKGROUND

§1.1 Field of the Invention

Embodiments consistent with the present invention relate to user authentication for devices with touch sensitive elements, such as touch sensitive display screens for example.

§1.2 Background Information

Most desktop and laptop computers, and portable devices such as mobile phones, pagers, and organizers, use a keyboard or a small keypad for human-machine interaction and data entry. As an alternative to keyboards, keypads, and mice or other pointer devices, some computers and portable devices use touch screen displays for data entry and user interaction. While early touch screen devices required the use of a stylus to track touch coordinates, recent devices allow users to use their fingers to enter inputs over touch screen display. Some touch screen devices can track multiple touch coordinates to improve the efficiency and quality of user device interaction.

Today, most authentication systems use alphanumeric passwords. In systems using alphanumeric passwords, users are asked to specify a username and a password to create an account. Later, during an authentication phase, users must enter their usernames and passwords correctly to start a session.

The security level of alphanumeric based password systems relies on the use of passwords with high entropy. Unfortunately, it is very hard for many users to remember a high entropy password which consists of random numbers, letters, and/or symbols. If users are forced to use high entropy passwords, they may tend to write them down on a sheet of paper, but this creates another security problem. To cope with these problems, smart cards or biometrics might be used with the classic alphanumeric passwords to increase the system security. However, these technologies increase system costs.

Problems that arise when alphanumeric passwords are used on computers and portable devices with touch sensitive input include the following. First, it may be hard and distracting for users to enter alphanumeric passwords, especially if the password is long and random. This problem is exacerbated when a user must enter such a password using a virtual keyboard on a touch screen. Consequently, users generally select low entropy passwords which are easier to enter on the virtual keyboard, but which are inherently less secure. Even if high entropy passwords are used, it is hard to remember such high entropy passwords. So users might, and often do, write passwords down and keep these written passwords along with the portable devices to recall later. Unfortunately, this becomes a significant security threat considering the likelihood of theft. Using biometrics such as fingerprints increases system costs. Furthermore, biometrics alone, which are often static (that is, are based on a snapshot of information, such as a fingerprint for example, which does not change with time) can also be recorded and duplicated by attackers to circumvent the authentication system. Tokens and smart cards can be stolen or lost, and require users to carry additional items.

Furthermore, although many computers and portable devices in the market today have data input capabilities such as touch screens, touch pads, and accelerometers, for example, and although some proposed authentication systems use these devices (See, e.g., U.S. Pat. No. 6,421,453 titled "APPARATUS AND METHODS FOR USER RECOGNITION EMPLOYING BEHAVIORAL PASSWORDS," U.S. Pat. No. 6,935,951 titled "ELECTRONIC SIGNATURE CAPABILITY IN A GAMING MACHINE", U.S. Pat. No. 7,301,526 titled "DYNAMIC ADAPTATION OF GESTURES FOR MOTION CONTROLLED HAND-HELD DEVICES", U.S. Patent Application Publication No. 2003/0001818 titled "HANDWRITTEN DATA INPUT DEVICE AND METHOD, AND AUTHENTICATING DEVICE AND METHOD," U.S. Patent Application Publication No. 2003/0132974 titled "FREE-SPACE GESTURE RECOGNITION FOR TRANSACTION SECURITY AND COMMAND PROCESSING," U.S. Patent Application Publication No. 2004/0239624 titled "FREEHAND SYMBOLIC INPUT APPARATUS AND METHOD," U.S. Patent Application Publication No. 2005/0063567 titled "AUTHENTICATION APPARATUS AND AUTHENTICATION METHOD," U.S. Patent Application Publication No. 2007/0236330 titled "SYSTEM AND METHOD FOR PERFORMING USER AUTHENTICATION BASED ON USER BEHAVIOR PATTERNS," U.S. Patent Application Publication No. 2008/0092245 titled "MULTI-TOUCH DEVICE BEHAVIOMETRIC USER AUTHENTICATION AND DYNAMIC USABILITY SYSTEM," U.S. Patent Application Publication No. 2008/0192005 titled "AUTOMATED GESTURE RECOGNITION," U.S. Patent Application Publication No. 2008/0273764 titled "PERSONAL GESTURE SIGNATURE," and U.S. Patent Application Publication No. 2009/0083847 titled "EMBEDDED AUTHENTICATION SYSTEMS IN AN ELECTRONIC DEVICE," each incorporated herein by reference.), such proposed authentication systems could be improved to provide more user friendly and/or more secure authentication.

§2. SUMMARY

At least some embodiments consistent with the present invention use a touch sensitive device (e.g., a touch screen, a touchpad, etc.) as an means to receive information used for user authentication. Various embodiments consistent with the present invention may use various non-centroid touch information such as one or more of (1) area(s) of time series touch samples, (2) shape(s) of time series touch samples, (3) orientation(s) of time series touch samples, (4) a sequence of time series touch samples, (5) multiple touch characteristic(s) of time series multi-touch samples, etc., for user authentication.

Various embodiments consistent with the present invention may use additional information to increase security. Such additional information may include information received via the touch sensitive device, including at least one of (1) pressure of touch(es), (2) EEG measurement of touch(es), (3) impedance measurement of touch(es), (4) information derived from combinations of touch characteristics, such as bone structure of finger(s), hand, and/or wrist), etc. Alternatively, or in addition, such additional information may include information which might be received via means other than the touch device, including at least one of (1) geolocation, (2) voice input, etc.

§4. DETAILED DESCRIPTION

Embodiments consistent with the present invention may involve novel methods, apparatus, message formats, and/or data structures related to user authentication using information received via a touch sensitive element. The following description is presented to enable the making and use of embodiments consistent with the present invention, and is provided in the context of particular applications and their requirements. Thus, the following description of embodiments consistent with the present invention provides illustration and description, but is not intended to be exhaustive or to limit embodiments consistent with the present invention to the precise form disclosed. The general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to embodiments consistent with the present invention unless explicitly described as such. Thus, the present invention is not intended to be limited to the embodiments shown and the inventors regard their invention to include any patentable subject matter described.

As used in the following, a "signature" should be broadly interpreted to include a time series of samples of touches of a fingertip or fingertips received by a touch sensitive device. Therefore, a signature may include (A) samples of a single continuous touch gestures where a fingertip(s) is always in contact with the touch sensitive element (such as a cursive writing of one's name without dotting i's and crossing t's, a scribble, etc.), (B) samples of non-continuous touch gestures where a fingertip leaves the screen (such as a sequence of entered arbitrary shapes, scribbles, alpha-numeric characters, taps, etc.), (C) a multi-fingertip gesture (such as pinching two or more fingertips together, spreading two or more fingertips apart, rotating two or more fingertips, swiping two or more fingertips, etc.), or (D) any combination of the foregoing.

§4.1 Exemplary Apparatus

Figure 1:
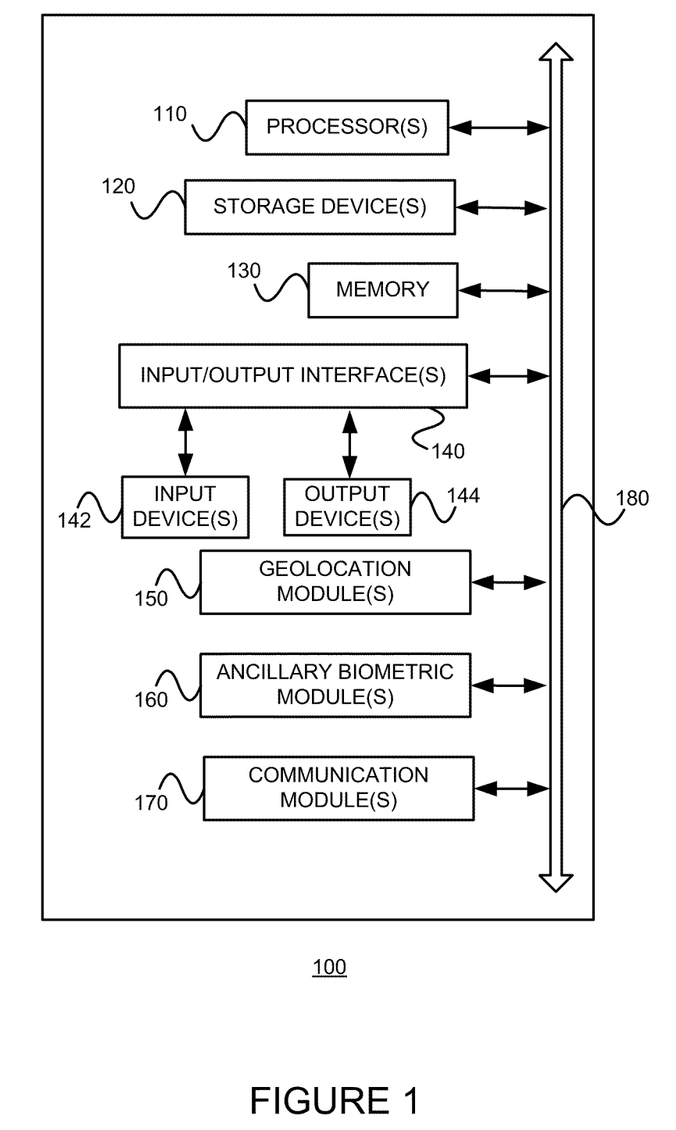
FIG. 1 is a schematic view of a portable device on which an authentication system consistent with the present invention may be embodied.

Referring to FIG. 1, embodiments consistent with the present invention may be implemented using program instructions stored on one or more storage device 120 (e.g., non-volatile storage) executed by one or more processors 110 (e.g., general purpose microprocessors, and/or application specific circuits) in a device 100. The device 100 also includes memory 130 (e.g., working RAM), input/output interfaces 140 coupled with one or more input devices 142 and output devices 144. These elements may exchange data via one or more buses and/or networks 180. The input devices 142 include a touch sensitive element, such as a touch screen, a touch input device, and/or acceleration detecting means. The output devices 144 may include a speaker, a display (which may be a touch sensitive display), etc. The device 100 may also include a geolocation module (e.g., a GPS location device) 150, ancillary biometric modules (e.g., voice recognition, fingerprint recognition, iris recognition, etc.) 160 and/or communication modules (e.g., voice and/or data transmitter(s) and/or receivers) 170. These elements may also exchange data with the one or more buses and/or networks 180. An iPhone™ mobile telephone or an iPod Touch™ mobile device from Apple Inc. of Cupertino, Calif., provided with appropriate program instructions (e.g., as an application), are examples of such a device 100. Thus, the device 100 can capture user signature data entered via a user's fingertip (s). The device 100 might also be capable of receiving other information used for user authentication such as user biometric data (via ancillary biometric module(s) 160), position of the device 100 (e.g., via geolocation module(s) 150), device movements (e.g., via accelerometer(s) on the device 100), etc.

The device 100 may be programmed to perform various user authentication functions (described below) using such collected information in a manner consistent with the present invention. The device 100 may comprise a mobile phone, a personal digital assistant, a still camera, a video camera, a pocket calculator, a portable radio or other music or video player, a game device, a game controller, a watch, a remote controller, an internet tablet (or "NetBook"), a mobile internet device, a headset, eyewear or any device which can be worn or held by a user.

Figure 2:
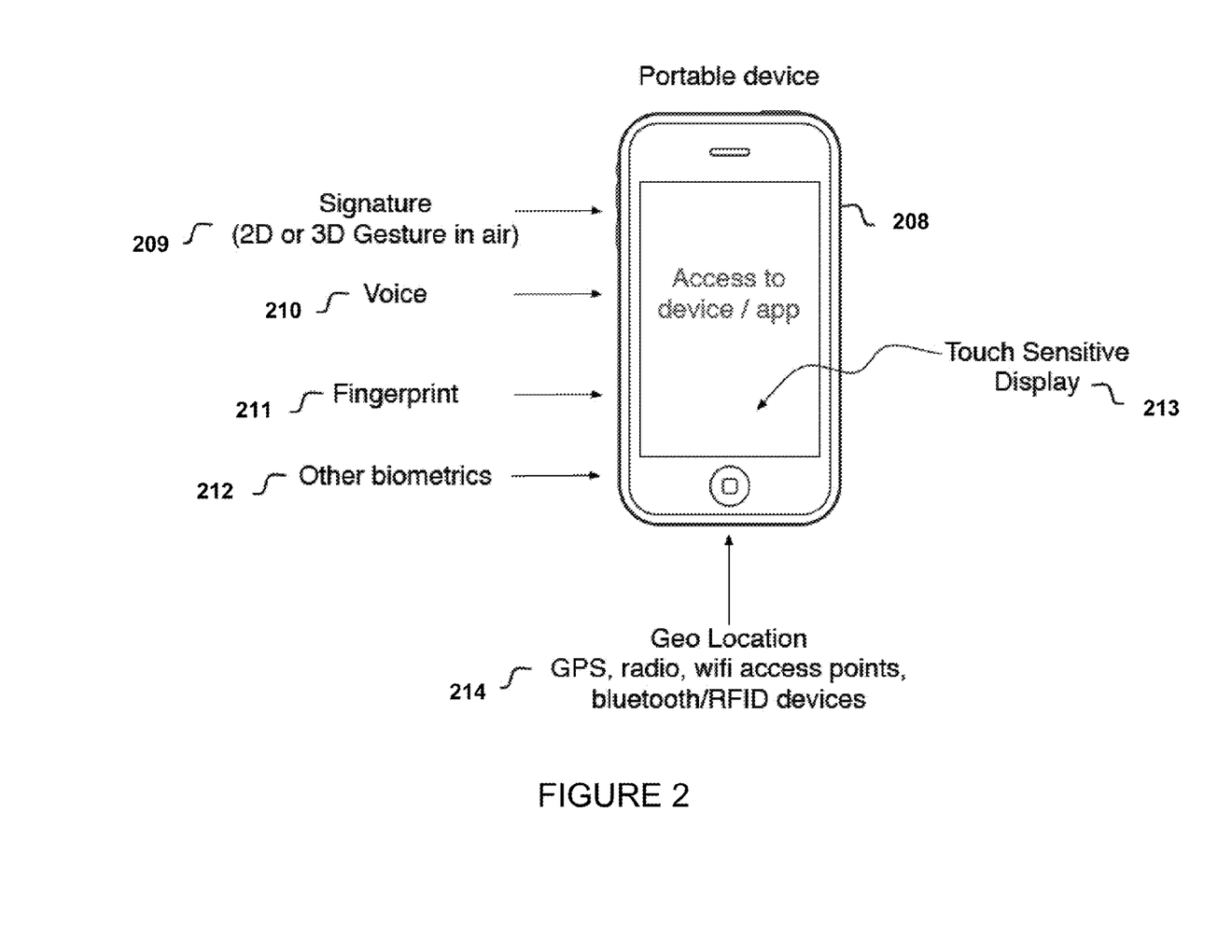
FIG. 2 illustrates a portable device with touch sensitive display, motion sensors, biometric sensors, and location detection module on which an authentication system consistent with the present invention may be embodied.

FIG. 2 further illustrates an exemplary portable device 208 on which user authentication consistent with the present invention may be provided. The exemplary portable device 208 includes biometric and behavior-metric sensors (209-212) and geolocation detection module (214), with a touch sensitive panel or display 213 in a particular embodiment consistent with the present invention. Data collected from the touch sensitive display 213 and perhaps one or more of the other sensors and modules may be used in authentication of the user to the device 208, or to a local or remote application or a service.

§4.2 Exemplary Methods

In some embodiments consistent with the present invention, a method is provided for enabling entry of a signature through a touch sensitive device (touch screen, touch pad, etc) without requiring any stylus or similar apparatus. Users may draw their own signatures on the touch screen to be granted access to the device, certain functionality on the device, and/or to local or remote applications or services. Users might select the same signature they use in general (e.g., for legal documents) to authenticate themselves. Another embodiment of the present invention is to provide a user authentication method based on signature, biometric, and behaviometric data by means of utilizing the touch sensitive device.

Figure 3:
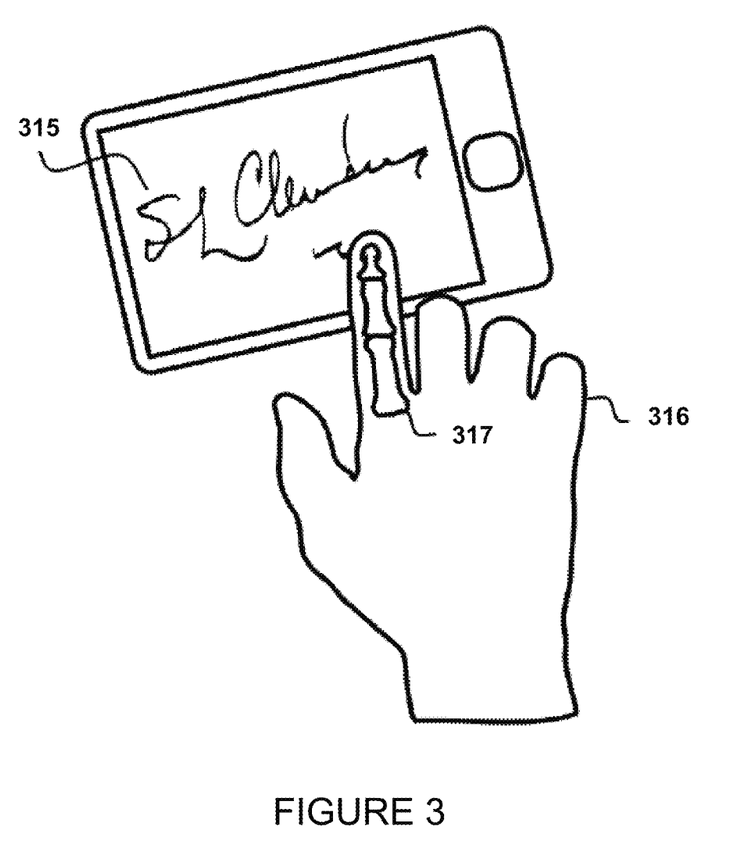
FIG. 3 illustrates an example of user authentication using a signature drawing over a touch sensitive panel or display consistent with the present invention.

In an exemplary method consistent with the present invention, a user is authenticated by receiving a time series of samples from a signature to be performed on a touch sensitive device by a user through use of one or more of their fingers. (See element 315 of FIG. 3.) Here, the signature means that a user 316 moves their finger(s) 317 over the touch sensitive device to draw their signature 315.

If the touch sensitive device is a touch screen, the signature drawing can be shown on the touch screen in real time. However, displaying the signature on a touch screen or on another display is optional. Some applications may require not displaying what is drawn on a touch sensitive device for enhanced security. It is also possible to display on the screen an image that facilitates the entry of the signature for the user.

Figure 7:
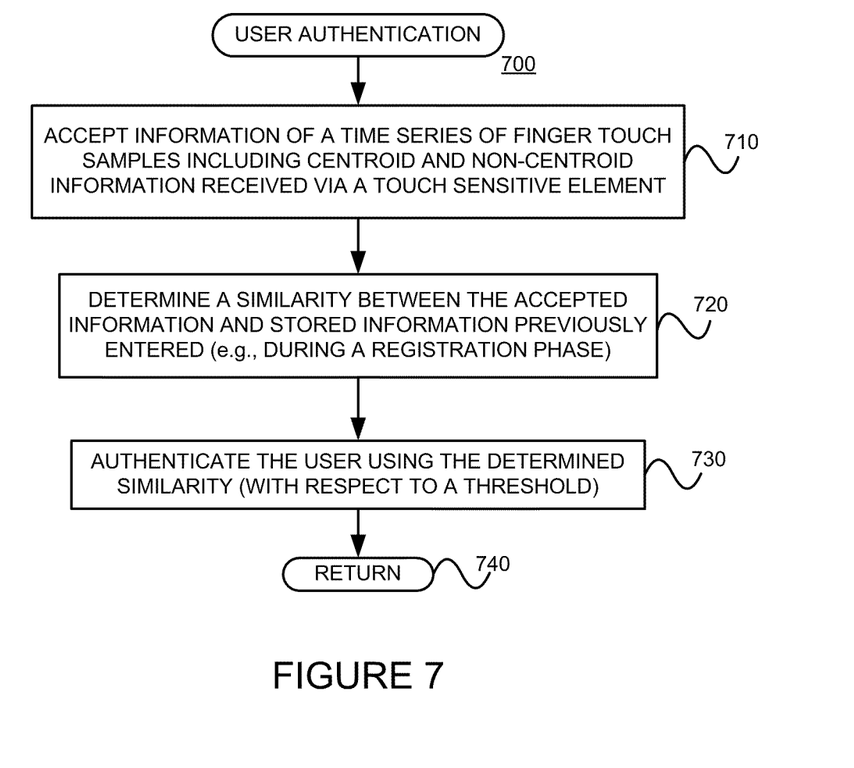
FIG. 7 is a flowchart of a method for authenticating a user on a system based on signature recognition utilizing a time series sequence of finger touch information samples from a touch sensitive element in a manner consistent with the present invention.

In an exemplary method consistent with the present invention, finger touch information (e.g., a time series of finger touches) is accepted from a user via a touch sensitive surface, the finger touch information including at least a time series of finger touch centroid coordinates that define a trace of the user's signature, as well as finger touch information in addition to the centroid coordinates (e.g., an area of the finger touch sample, a shape of the finger touch sample, an orientation of the finger touch sample, a multi-touch sample, characteristics of a multi-touch sample, etc.). (See Block 710 of FIG. 7.) A similarity is then determined between the accepted finger touch information and stored information previously provided by the user (e.g., during a registration phase described below). (See Block 720 of FIG. 7.) Finally, the user is authenticated based on at least the determined similarity (e.g., with respect to a stored or determined threshold). (See Block 730 of FIG. 7.)

Figure 6:
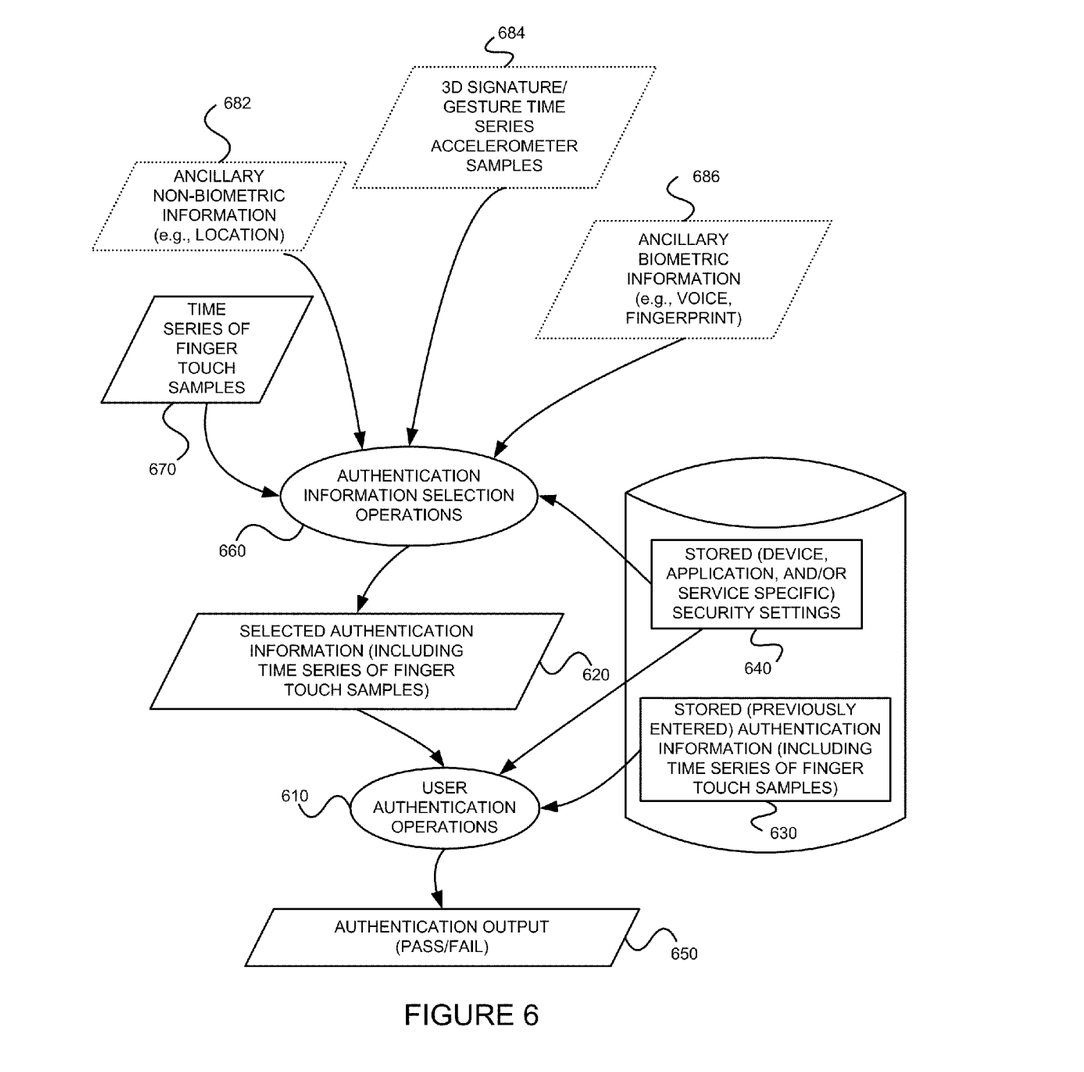
FIG. 6 is a bubble diagram of operations for the selection and use of authentication information based on stored security settings in a manner consistent with the present invention.

FIG. 6 is a bubble diagram of operations for the selection and use of authentication information based on stored security settings in a manner consistent with the present invention. User authentication operations 610 may use selected authentication information 620 (including at least a time series of finger touch samples 670), stored authentication information 630 and stored security settings (e.g., a similarity threshold) 640 to generate an authentication output (e.g., pass fail) 650. An example of such user authentication operations 610 is the method 700 described above with reference to FIG. 7.

Although not necessary, authentication information selection operations 660 may select various available additional authentication information such as ancillary, non-biometric information (e.g., geolocation) 682, 3D signature gesture series accelerometer samples 684, and/or ancillary biometric information (e.g., voice print, fingerprint, iris scan) 686. Such selection operations 660 may consider a stored security setting 640. The security setting may be device specific, location specific, service specific, and/or application specific. As described below, a similarity threshold used for determining whether or not a user is authenticated might be adjusted as a function of various factors.

§4.2.1 Registration Phase

Figure 4A:
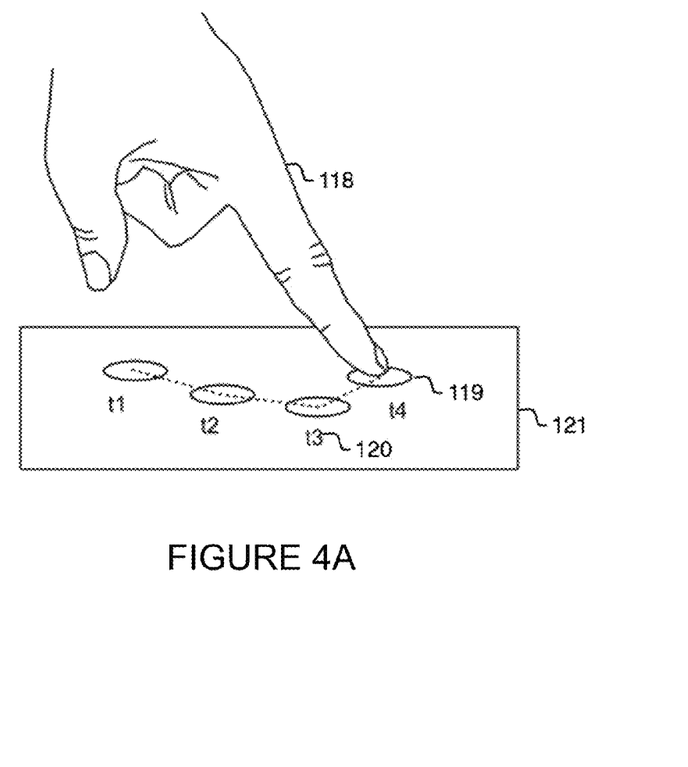
FIG. 4A illustrates an example of user authentication with information captured through a fingertip (or fingertips) as a time series in accordance with the present invention.
Figure 4B:
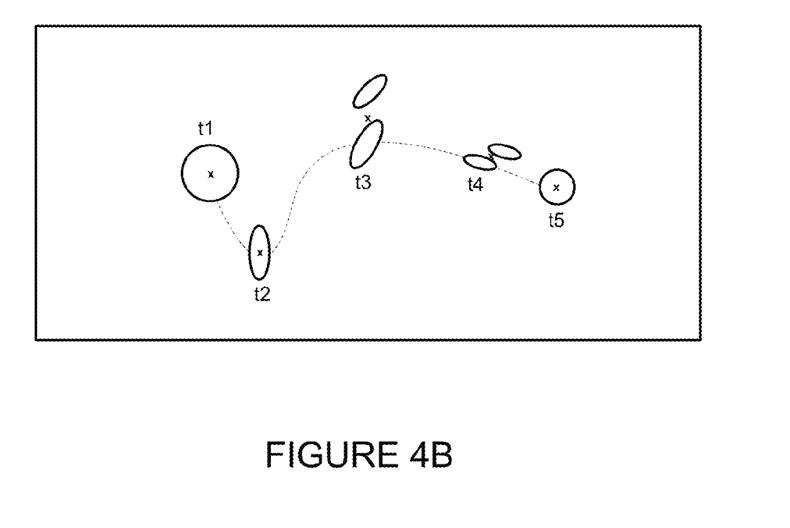
FIG. 4B illustrates an example of user authentication using information about the shape, area, and/or orientation of each finger touch point of a time series captured in accordance with the present invention.
Figure 4C:
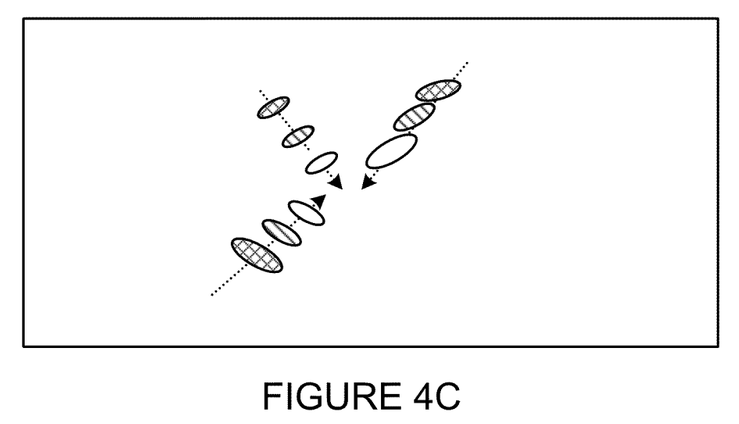
FIG. 4C illustrates an example of user authentication using information from samples of a time series of a multi-touch "pinch" signature gesture.
Figure 4D:
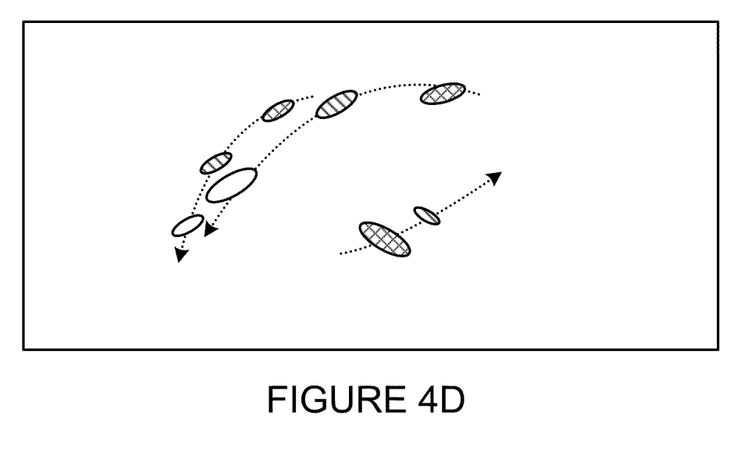
FIG. 4D illustrates an example of user authentication using information from samples of a time series of a multi-touch "twist" signature gesture.

The proposed authentication scheme has two phases. In the first phase, called the "registration" phase, a user creates an account on a device and enters, one or more times, the signature with their finger(s) on a touch sensitive element of the device. In the registration phase, user "signature" data is recorded as time series containing the coordinates of signature drawing. (See, e.g., FIGS. 4A-4D). Note in FIG. 4B, each of the centroids of the samples at times t1-t5 are depicted by an "x". However, non-centroid information such as the entire area, orientation and shape of the touch screen surface contacted by the user's fingertip(s) are obtained. For example, although the samples at times t1 and t5 are both circular in shape, they have different sizes. Note also that the oval samples at times t2-t4 have different orientations. Also, the samples at times t3 and t4 are multi-touch samples (since more than one fingertip is touching the touch sensitive element simultaneously). Multi-touch samples may include characteristics such as number of discrete touch areas, relative orientations of each discrete touch area, collective orientation of the discrete touch areas, distance(s) between discrete touch areas, etc. FIG. 4C illustrates a multi-touch "pinching" signature in which a user's thumb and two fingers are brought together. Touches captured at a first time are depicted with cross-hatching, touches captured at a second time are depicted with hatching, and touches captured at a third time are depicted with no hatching. A multi-touch "spreading" (as opposed to pinching) signature may be similarly entered and captured. FIG. 4D illustrates a multi-touch "twist" signature in which a user's thumb and two fingers are collectively rotated with a counter-clockwise wrist twist. Touches captured at a first time are depicted with cross-hatching, touches captured at a second time are depicted with hatching, and touches captured at a third time are depicted with no hatching. (Note that the thumb is lifted off from the touch sensitive element at the end of the twist signature.) As should be appreciated from the foregoing, additional information related to physical characteristics of the user's fingertip(s) (and perhaps finger, hand, wrist, etc) may be captured—not just the centroid x,y coordinates of finger touch samples.

To increase the signature entropy, additional biometric information of the user can be captured via the signature operation (finger pressure, finger print, skin impedance, etc.) and/or via other biometric input devices (e.g., voice, iris, accelerometers, etc.). Data about the size of the individual bones in the hand and wrist as well as their flexibility and strength can be implied through special gestures that the user performs on the touch sensitive area (and/or through the accelerometer). This additional biometric information data might be used in conjunction with the signature data to increase the system security.

Figure 5:
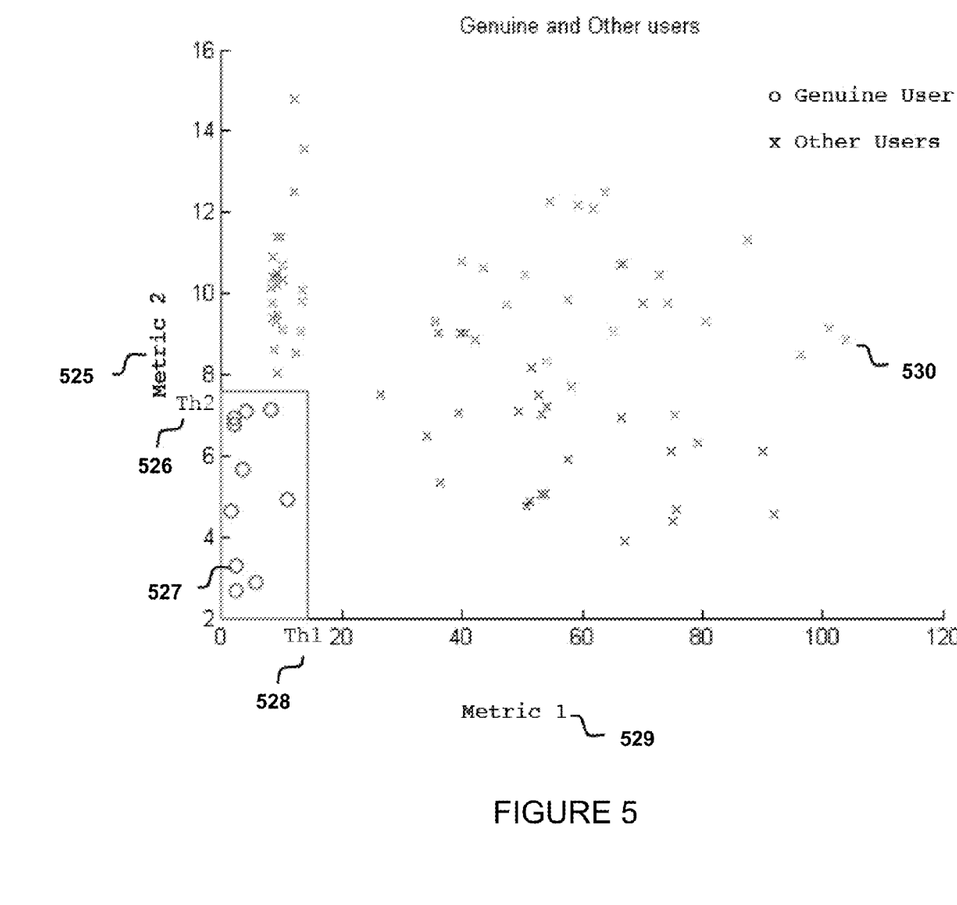
FIG. 5 shows the distribution of specific metrics of acceleration data that were captured during 3D "air signature" accelerometer inputs by different users.

FIG. 5 shows the distribution of specific metrics 525,526 and 528,529 of acceleration data that were captured during 3D "air signature" accelerometer inputs by different users (including the genuine user 527 and other users 530). As should be appreciated from this plot, 3D "air signature" gesture information captured by accelerometers may be used to supplement the signature information captured via the touch sensitive element.

During the registration phase, the system collects one or many of these traces. Based on application requirements, the signature can be either stored with individual instances or in a parametric form based on a prior signature model. Instance based methods have a cheaper initialization, and hence may be more appropriate for mobile devices. On the other hand, feature-based signature classification may be more suitable for more powerful devices such as desktops or laptops.

When user signature and biometric information is captured, it is stored in a database, either as raw data, or in a post processed form. For user authentication, several features can be extracted from the signature and these features can be stored in the system as an alternative to store raw data of signature and biometrics. Based on application requirements, one of these data recording approaches can be preferred in the registration phase.

§4.2.1.1 Complexity of Signature

In one particular embodiment consistent with the present invention, during the registration phase, the security of the user's signature/gesture can be evaluated by the system (entropy of the signature). Considering the security metric(s), the user may choose to re-train or change the entered signature/gesture. The signature security can be evaluated in terms of complexity and consistency. While complexity refers to the difficulty of the drawing signature, consistency refers to whether or not the user draws the signature consistently. For a secure user authentication, complexity and consistency values should be as high as possible.

One way of computing the signature complexity is to compute (N0×N1) dynamic time warping ("DTW") values between the entered signatures (N0: num. of entries) in training phase and the pre-recorded signature(s)/gesture(s) (N1: num of pre-recorded signatures) which can be either real or computer generated. If the user's signature/gesture entry yields relatively high DTW values for the pre-recorded signature/gesture data, the user's entries can be considered as complex and relatively secure. This analysis can be optional due to its time complexity.

§4.2.1.2 Consistency of Signature

Figure 8:
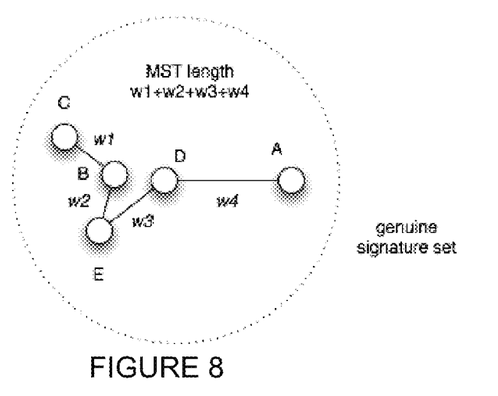
FIG. 8 illustrates an example of using minimum spanning tree (MST) length for measuring signature consistency in a manner consistent with the present invention.

The signature consistency can be measured by computing DTW of each signature entry with other signatures recorded in the training phase. If N signatures are entered in the training phase, N×(N−1)/2 DTW values are computed for consistency check. If each signature is treated as a node, and the DTW values are treated as weights of the edges of a graph of signatures, the minimum spanning tree ("MST") length of a signature graph can be used as a measure of signature consistency. (See FIG. 8.) If a user enters their signatures in a very consistent manner, the MST length becomes significantly low. If MST length is too high, the user can be warned to retrain or change the signature.

§4.2.2 Authentication Phase

In the second phase, referred to as the "authentication" phase, a user is asked to enter their signature over the touch sensitive panel. Once the signature information and/or other user biometric information are captured, they are compared with the user data recorded and stored during the registration phase. To compare the current data entry with the stored one in the system, a similarity metric is computed. If the similarity metric is above a predefined threshold the user is authenticated. Otherwise, the user is rejected. After a predetermined number of rejections (e.g., 3-5), the system can be locked for security. The user might then be asked to a enter system/personal password in an alphanumeric form.

At the time of verification, the entered signature is compared against the data stored during the registration phase. (Recall, e.g., Block 720 of FIG. 7.) The user is granted access to the device and/or applications or services residing on the device or accessed via the device depending on the similarity between the accepted information of a time series of finger touch samples (including centroid and non-centroid information) received via the touch sensitive element and corresponding information from the registration phase.

The authentication system may also gather (via direct measurement and/or derivation) biometric information about the user's hand, such as the length of the individual bones, size of the palm and fingers, and shakiness of the hand to complement the collected signature trace(s). The users may enter their biometric information in a user friendly way using the touch interface and/or the accelerometer by touching, holding and/or carrying the device in specific ways that expose the user identity to the device.

Embodiments consistent with the present invention can also be used with classic alphanumeric passwords. Based on user preference, either an alphanumeric password or signature drawing can be requested for authentication. To increase the system security, the combination of alphanumeric password, user signature, and biometric information could also be used together.

§4.3 Use of Dynamic Time Warping for Determining Similarity Between Signatures

In signature recognition, dynamic time warping (DTW) is used to compute the similarity between two signature sequences with different lengths. In general, it is very hard to write signatures with the same speed and the length. Therefore, the similarity of the signatures cannot be computed with classic cross correlation methods.

Similar to string matching, DTW algorithm can be used to find a best match between two signature "time" series. To overcome local synchronization problems in the time, the signatures are "warped" nonlinearly and two time series are tried to be aligned. The similarity measurement is realized using "dynamic" programming. The algorithm can be run in polynomial time and it is very suitable to be used in mobile devices such as smart phones, PDA, etc.

There are several different implementations of DTW. In the following, two of these forms of the algorithm will be introduced. Let A and B be time series of two signatures with different lengths. The distance between A and B is calculated by checking all possible alignments of events in two time series. Then, the alignment which gives the total minimum distance is computed through dynamic programming with the following equation:

$$M[i,j] = \text{Min}\{\text{value1}, \text{value2}, \text{value3}\}$$

$$\text{value1} = M[i-1,j] + \text{Missing Penalty}, 1 <= i <= N\_A$$

value2=$M[i,j-1]$+Spurious Penalty, $1<=j<=N\_B$ value3=$M[i-1,j-1]$+Dist($A[i],B[j]$)

$DTW(A,B)=M[N\_A,N\_B]$

Where, M (matrix size=N_A×N_B) is similarity matrix of vector A and B, N_A and N_B are the vector lengths of A and B, respectively; Dist(A[i],B[j]) is the distance between ith and jth samples of A and B vectors. The final distance can then be computed as the latest element of D matrix: D(N_A,N_B).

Another alternative form of DTW can be as follows:

$M[i,j]$=Dist($A[i],B[j]$)+Min {val1, val2, val3} val1=$M[i-1,j]$, $1<=i<=N\_A$ val2=$M[i,j-1]$, $1<=j<=N\_B$ val3=$M[i-1,j-1]$ $DTW(A,B)=M[N\_A,N\_B]$ For a reliable signature recognition, DTW distances can be normalized since the overall distance values take relatively high values for long signature sequences than the short signatures. This normalization can be done either with vector lengths or considering the DTW values of several signatures of the same user. Techniques such as those described in the references: (1) Ronny Martens, Luc Claesen, "Dynamic programming optimization for on-line signature verification", *Proceedings of the 4th International Conference on Document Analysis and Recognition*, pp. 653-656 (1997); (2) Anil K. Jain, Friederike D. Griess, Scott D. Connell, "On-line signature verification", *Pattern Recognition*, Vol. 35, pp. 2963-2972 (2002); and (3)_Alisher Kholmatov, Benin Yanikoglu, "Identity authentication using improved online signature verification method", *Pattern Recognition Letters*, Vol. 26, pp. 2400-2408 (2005), may be used. Each of these three references is incorporated herein by reference.

§4.4 Refinements, Alternatives and Extensions

In one alternative embodiment, the system requires or permits a user to contact the touch sensitive element with more than one finger simultaneously (multi-touch input). The user might enter their own signature sequence or may be prompted to draw a particular shape using their fingers or prompted move their fingers in a particular motion for authentication purposes. The multi-touch input authentication uses similar registration and authentication phases as described above.

In another alternative embodiment, during the registration, a user is requested to enter their signature a number of times (e.g., five times). An analysis of the signatures is performed which determines a variation or standard deviation of the signatures entered. During the authentication phase, the signature entered must be within a pass/fail similarity threshold in order to be accepted as a valid signature.

In some embodiments consistent with the present invention, the pass/fail similarity threshold is adjusted as a function of at least one of (1) the variation or standard deviation of the initial X samples input during the registration phase, (2) the location of the device, (3) a security level of the device, service or application sought to be accessed, (4) additional biometric information captured by the device, etc. Thus, for example, if the variation or standard deviation of the initial X samples input during the registration phase is low, the similarity threshold might be adjusted higher (made more strict), and if the variation or standard deviation of the initial X samples input during the registration phase is high, the similarity threshold might be adjusted lower (relaxed). As another example, if the device is located where expected (e.g., at the user's residence or workplace), the similarity threshold might be adjusted lower (relaxed), and if the device is located where unexpected or in an area associated with fraud (e.g., in a foreign country or in an area associated with crime or identity theft), the similarity threshold might be adjusted higher (made more strict). As yet another example, if the security level of the device, service or application sought to be accessed is low (e.g., playing a game), then the similarity threshold might be adjusted lower (relaxed), and if the security level of the device, service or application sought to be accessed is high (e.g., personal banking), then the similarity threshold might be adjusted higher (made more strict). Finally, if additional biometric information is captured by the device and matches biometric information entered earlier by the user, then the similarity threshold might be adjusted lower (relaxed).

In another embodiment consistent with the present invention, the touch sensitive display or panel may not allow the drawing of a full-length version of the user's signature due to the physical size limitations of the touch sensitive area. In such cases the user may choose to enter a short version of his/her signature, or select the option to scroll the display to the opposite direction of the trail of the user's touch. For instance, if the user draws a horizontal line towards the right edge of the touch sensitive area, the display that reflects the drawing scrolls to the left. This will allow the user to enter a larger drawing on a smaller touch sensitive surface, similar to a treadmill.

In another particular embodiment consistent with the present invention, in order to help the users judge the correctness of the drawn pattern or signature, the system can display particular colors, shapes, symbols, and/or characters as a function of the drawing. Over several sessions, the user may become familiar with the pattern and the corresponding display outputs. When the user fails to correctly draw the required authentication pattern or signature, the display may show unrelated characters, symbols and/or colors so the user may understand the current drawing is not appropriate for authentication. The advantage of this feedback mechanism is its ability to inform the user about the validity of the input without even executing the user verification and authentication module. In one embodiment, the feedback mechanism may comprise vibrations and/or sound signals that change as a function of drawing.

In another particular embodiment consistent with the present invention, the system may give the user the option to show or hide their signature as it is entered to prevent onlookers from stealing the signature. Similarly, the system may display a false signature as the user's signature is entered to thwart would be thieves.

As described above, in particular embodiments consistent with the present invention, geolocation information is used as additional authentication information. Portable devices can be moved from location to location, hence it is possible to use them in different places as opposed to desktop computers. For various reasons, which include concerns for theft or information leakage, either users or companies may choose to restrict specific geographic locations (e.g. office, neighborhood, city, highway, state, country, etc.) or vicinity of a moving base (e.g. mobile satellite station, service van, delivery van, or a combination of vehicles and/or devices etc.) where the devices or applications can be used. The location or the nature of the vicinity of a portable device can be captured by sensors and radios (Recall, e.g., 150 of FIG. 1.) such as GPS receiver, predefined or learned wireless access points, radio broadcasts (FM, RDS, etc.), Bluetooth and RFID neighborhoods. The user might choose either a specific location or an area defined by proximity to other transceivers (such as RFID tags, Bluetooth devices, FM radio, RDS, cell phone tower, etc.) for allowing the use of the device or application. If the device is out of this specified region, the application or the device will not operate or limit operation. In addition, if the device is within a specified region, the level of signature matching (i.e., variance in signature from stored signature samples) may not be as stringent then if the device were located outside a specified region.

As described above, additional biometric information might be captured. For example, some devices may provide advanced biometric data such as skin texture, skin softness, physical characteristics of the hand and bones, EEG and EMG signals captured over the skin, or through implants, and even user DNA. These extra biometric information can be combined with the user signature (and perhaps other information such as location, user voice, fingerprint, etc.) for a more secure authentication to control access to a device, application, or features.

In one particular embodiment consistent with the present invention, at the initialization and training time during the registration phase, the user may further record and set biometric and/or geographic information in the authentication system. During authentication, the user draws their signature or a pre-defined shape on the touch screen using their finger. Meanwhile, the location and/or proximity of the device with respect to the authorized areas are captured. As an option, while drawing the signature, the user may utter a predefined phrase or a phrase that is presented as a challenge (e.g. by displaying on the screen, or by voice synthesis, or as a CAPTCHA) by the device. Optionally, if the device can read fingerprints, the fingerprints can be captured while the user is holding the device during signature entry or as a separate step. The other biometric information mentioned in the advanced biometrics component can also be captured and used with this combination.

Policies might define the valid combinations of these authentication components that would allow access to the device, application or feature (e.g. signature and location, signature and voice, signature and voice and location, etc).

In one particular embodiment, the user can set a high entropy alphanumeric master password. If the user fails a predetermined number (K) times in the authentication step, the system may ask the master password and disable the signature/gesture entry until the master password is entered correctly. This feature can prevent brute force attacks.

At least some embodiments consistent with the present invention allow the user to change (e.g., re-register) the signature at any time if user is successfully authenticated.

Figure 9:
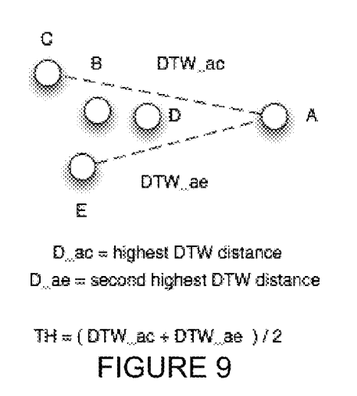
FIG. 9 illustrates an example of an alternative detection of dynamic time warping (DTW) decision threshold in a manner consistent with the present invention.

Recall that under some exemplary embodiments consistent with the present invention, if the variation or standard deviation of the initial X samples input during the registration phase is low, the similarity threshold might be adjusted higher (made more strict), and if the variation or standard deviation of the initial X samples input during the registration phase is high, the similarity threshold might be adjusted lower (relaxed). Thus, for example, during the registration phase, a DTW decision threshold can be set adaptively instead of using a fixed value. Let N be the number of signatures entered in the registration phase. To compute the DTW decision threshold, all signatures are compared with each other and $N*(N-1)/2$ DTW values are computed. For each signature, its average similarity to other signatures is computed from the DTW values and the least similar signature(s) are detected out of N signature entries. The DTW decision threshold (TH) is set based on these least similar signatures which have significantly high average DTW values than other signatures. See FIG. 9 for an alternative decision threshold.

Figure 10:
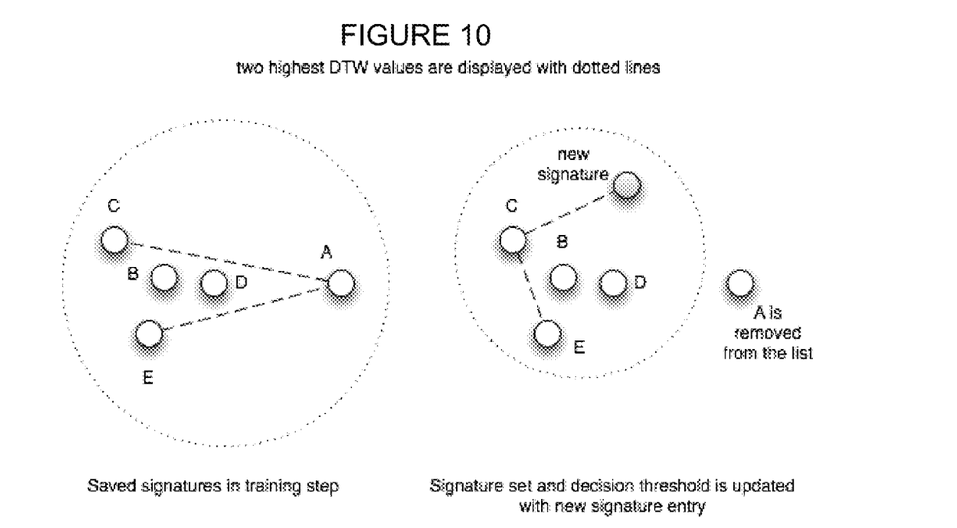
FIG. 10 illustrates an example of updating a genuine signature set and DTW decision threshold after a successful authentication session in a manner consistent with the present invention.
Figure 11:
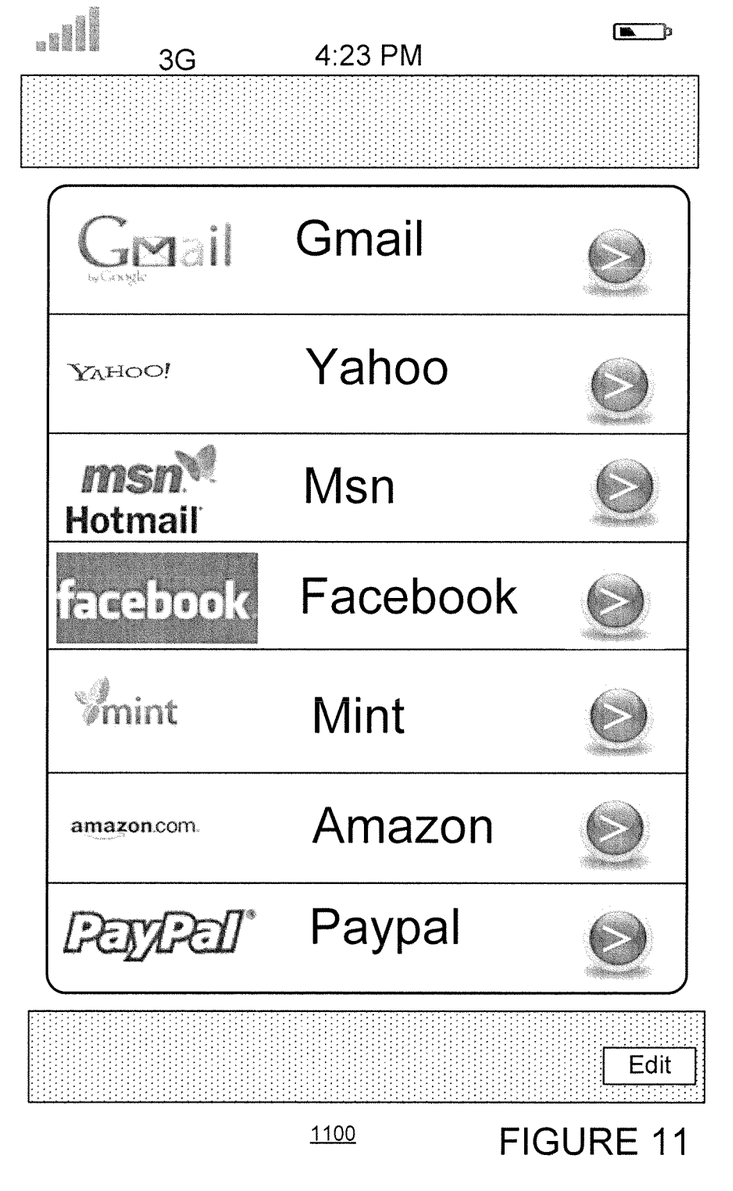
FIG. 11 is a user interface screen that allows the user to choose among several credentials to different remote services and to update these credentials in a manner consistent with the present invention.

In another particular embodiment consistent with the present invention, the decision threshold can be updated in the authentication session. This can be done by saving the signatures which are successfully authenticated. In each successful authentication session, the decision threshold can be updated considering all signatures in the system with the new entry. One shortcoming of this approach is that it does not scale well due to space and time constraints. An alternative solution would be saving the new signature into the genuine signature set and removing the least similar signature from the genuine signature set. In this case, the number of signatures saved in the system does not change but the genuine signatures converge to a more compact signature set, which should lead to better security. With such a system, the decision threshold can be updated in each successful authentication session considering the new signature set without sacrificing disk space and the threshold computation time. (See FIG. 10.)

§4.5 Conclusions

As can be appreciated from the foregoing, embodiments consistent with the present invention provide useful user authentication systems and methods for devices with a touch sensitive element. Embodiments consistent with the present invention provide enhanced ease of use, since entering and remembering a signature would be easier than entering long and random passwords without sacrificing security.

Such embodiments avoid problems associated with password sharing since users cannot give the authentication information used (it is hard to express the way a signature is drawn, and the signature depends on biometrics of the user which are hard to replicate). Such embodiments provide high entropy given the uniqueness of signature, writing style, finger pressure, finger size, finger shape, finger orientation at various times, etc. Since embodiments consistent with the present invention are proposed for devices with touch sensitive elements, authentication systems consistent with the present invention do not require any extra hardware costs(unless they are augmented with other biometric information).

What is claimed is:

1. A computer-implemented method for authenticating a user, the method comprising:
   a) receiving, by a computer system, finger touch information via a touch sensitive element, the finger touch information including at least a time series of finger touch samples that define a trace of a signature, at least a portion of which includes a continuous touch gesture during which at least one fingertip is always in contact with the touch sensitive element;
   b) determining, by the computer system, a similarity between the time series of finger touch samples of the received finger touch information and stored finger touch information including a time series of finger touch samples previously provided by the user; and
   c) authenticating, by the computer system, the user using at least the determined similarity by
      1) receiving the stored finger touch information previously provided by the user,
      2) determining a location of the computer system,
      3) receiving a pass-fail threshold,
      4) adjusting the pass-fail threshold as a function of the determined location of the computer system,
      5) determining whether the similarity is above the adjusted pass-fail threshold; and
      6) responsive to a determination that the similarity is above the adjusted pass-fail threshold, authenticating the user, and otherwise, responsive to a determination that the similarly is not above the adjusted pass-fail threshold, not authenticating the user.

2. The computer-implemented method of claim 1, wherein the stored finger touch information previously provided by the user is provided during a registration phase, the registration phase including
1) prompting, by the computer system, the user to enter their signature a plurality of times via the touch sensitive element using one or more of their fingers;
2) receiving, by the computer system, the user's signature the plurality of times requested as finger touch information from the user via the touch sensitive surface,
3) determining, by the computer system, a standard deviation of the plurality of the user's signatures received; and
4) storing, by the computer system, the received finger touch information and the determined standard deviation of the plurality of the user's signatures received.

3. The computer-implemented method of claim 1, wherein the act of determining a similarity uses dynamic time warping to measure the similarity.

4. The computer-implemented method of claim 1, wherein the computer system displays the finger touch information input by the user.

5. The computer-implemented method of claim 1, wherein the computer system does not display the finger touch information input by the user.

6. The computer-implemented method of claim 1, wherein when the user enters an authenticated signature, the computer system displays a fake signature which does not match the finger touch information input by the user.

7. The computer implemented method of claim 1 wherein each of the finger touch samples includes centroid coordinates and non-centroid information of a single finger, the non-centroid information including at least one of (A) a shape of the single finger of the finger touch sample, (B) a size of the single finger of the finger touch sample, and (C) an orientation of the single finger of the finger touch sample, and
wherein the non-centroid information includes characteristics of multi-touch finger touch sample.

8. Apparatus for authenticating a user, the apparatus comprising:
a) at least one processor;
b) a touch sensitive element for receiving finger touch information; and
c) at least one storage device storing program instructions which, when executed by the at least one processor, perform a method including
1) receiving finger touch information via the touch sensitive element, the finger touch information including at least a time series of finger touch samples that define a trace of a signature, at least a portion of which includes a continuous touch gesture during which at least one fingertip is always in contact with the touch sensitive element,
2) determining a similarity between the time series of finger touch samples of the received finger touch information and stored finger touch information including a time series of finger touch samples previously provided by the user, and
3) authenticating, by the computer system, the user using at least the determined similarity by
A) receiving the stored finger touch information previously provided by the user,
B) determining a location of the apparatus,
C) receiving a pass-fail threshold,
D) adjusting the pass-fail threshold as a function of the determined location of the apparatus,
E) determining whether the similarity is above the adjusted pass-fail threshold; and
F) responsive to a determination that the similarity is above the adjusted pass-fail threshold, authenticating the user, and otherwise, responsive to a determination that the similarly is not above the adjusted pass-fail threshold, not authenticating the user.

9. The apparatus of claim 8, wherein the stored finger touch information previously provided by the user is provided during a registration phase, the registration phase including:
1) requesting that the user enter their signature a plurality of times via the a touch sensitive surface using their finger;
2) receiving the user's signature the plurality of times requested as finger touch information from the user via the touch sensitive surface;
3) determining a standard deviation of the plurality of the user's signatures received; and
4) storing the received finger touch information and determined standard deviation of the plurality of the user's signatures received.

10. The computer-implemented method of claim 1, further comprising adjusting the pass-fail threshold as a function of the plurality of the user's signatures entered during the registration phase.

11. The computer-implemented method of claim 1, further comprising adjusting the pass-fail threshold as a function of biometric information of the user captured by the computer system.

12. The computer-implemented method of claim 1, further comprising adjusting the pass-fail threshold as a function of a security level set on the computer system.

13. The computer-implemented method of claim 7, wherein the non-centroid information further includes biometric information of the user captured by the computer system.

14. The computer-implemented method of claim 13, wherein the biometric information of the user captured by the computer system includes at least one of (A) voice recognition information, (B) fingerprint recognition information, and (C) iris recognition information.

15. The computer-implemented method of claim 13, wherein the biometric information of the user captured by the computer system includes at least one of (A) finger pressure information, (B) skin impedance information and (C) finger skin EEG signal information.

16. The computer-implemented method of claim 1, wherein the pass-fail threshold is adjusted to be less stringent when the location of the computer system is within a specified region.

17. The computer-implemented method of claim 1, wherein the pass-fail threshold is adjusted to be less stringent when the location of the computer system is on an approved communication network.

18. The computer-implemented method of claim 1, wherein the stored finger touch information previously provided by the user is provided during a registration phase, the registration phase including
1) prompting, by the computer system, the user to enter their signature a plurality of times via the touch sensitive element using one or more of their fingers;
2) receiving, by the computer system, the user's signature as finger touch information from the user via the touch sensitive surface,
3) determining, by the computer system, that a strength of the signature is below a threshold, and 4) responsive to the determination that the strength of the signature is below a threshold, providing, by the computer system, a message to the user that the signature is too weak.

19. The computer-implemented method of claim 1, wherein the stored finger touch information previously provided by the user is provided during a registration phase, the registration phase including
1) prompting, by the computer system, the user to enter their signature a plurality of times via the touch sensitive element using one or more of their fingers;
2) receiving, by the computer system, a plurality of the user's signature as finger touch information from the user via the touch sensitive surface,
3) determining, by the computer system, that a similarity of the plurality of signatures is below a threshold, and
4) responsive to the determination that the similarity of plurality of signatures is below a threshold, providing, by the computer system, a message to the user that the signatures are too dissimilar.

20. The computer-implemented method of claim 3, wherein the act using dynamic time warping to measure the similarity includes
1) receiving a plurality of signatures,
2) setting a dynamic time warping threshold by
A) for each of the received plurality of signatures, computing its average similarity to other of the received plurality of signatures,
B) identifying the least similar signature as the one of the plurality of signatures with a lowest computed average similarity, and
C) setting the dynamic time warping threshold based on the identified least similar signature.

* * * * *